Oct. 21, 1969  H. M. CROSSWHITE, JR  3,473,865
OPTICAL PRISMATIC RHOMBOID FILTER DEVICE
Filed May 5, 1966  2 Sheets-Sheet 1
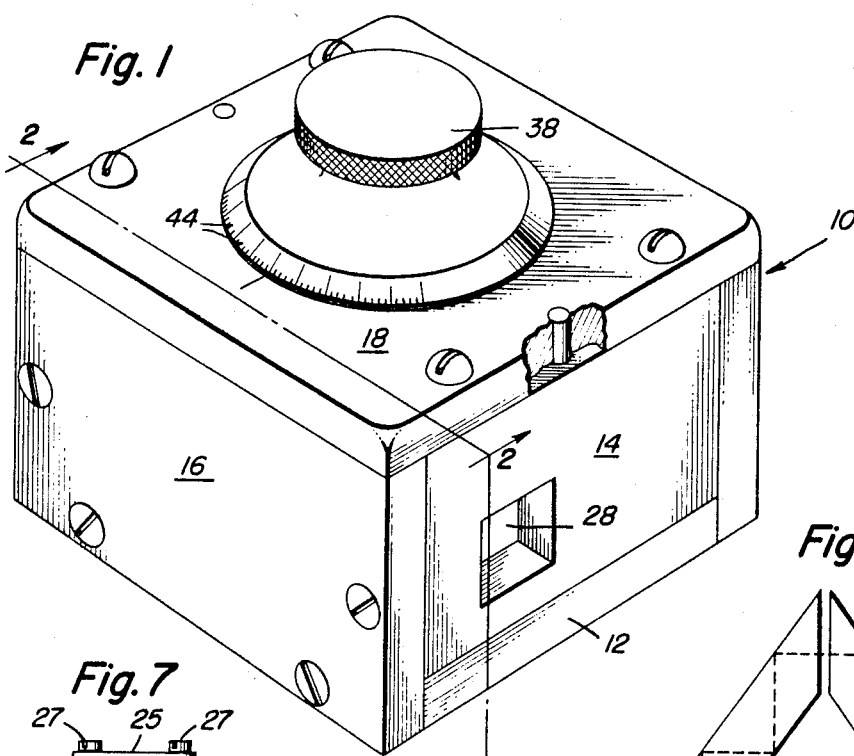
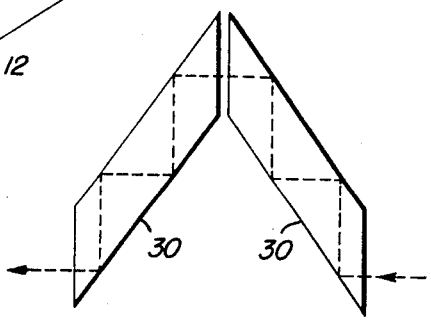
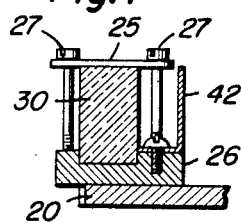
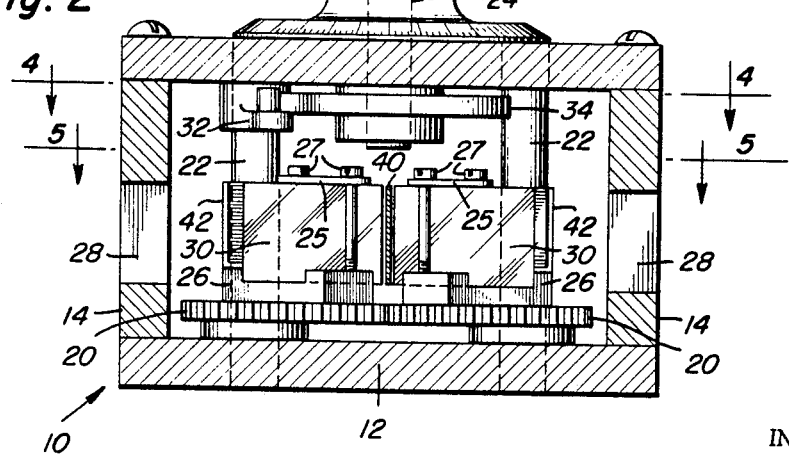
INVENTOR
Henry M. Crosswhite, Jr.
BY Walter G. Finch
ATTORNEY INVENTOR
Henry M. Crosswhite, Jr.

BY Walter G. Finch
ATTORNEY

United States Patent Office 3,473,865
Patented Oct. 21, 1969

3,473,865
OPTICAL PRISMATIC RHOMBOID
FILTER DEVICE
Henry M. Crosswhite, Jr., 1511 Jeffers Road,
Towson, Md. 21204
Filed May 5, 1966, Ser. No. 554,261
Int. Cl. G02b 5/04, 7/18
U.S. Cl. 350—168                                    4 Claims

ABSTRACT OF THE DISCLOSURE

A optical filter is disclosed which operates by multiple reflections within a prismatic rhomb. The characteristic is a sharp cutoff on the long wavelength side of a transmission band. The use of two rhombs in opposition makes possible the colinear input and output and further, by tilting one rhomb with reference to the other with geared sectors, a continuously variable cutoff wavelength is possible.

---

This invention relates generally to optical filters, and more particularly it pertains to a light filter having a selective wavelength cutoff.

Filters are widely used in photometry for isolating portions of the spectrum to the exclusion of others. However, it is often desirable to be able to adjust in a continuous fashion the cutoff wavelength of such a device or to set it at some definite point.

Accordingly, it is an object of this invention to provide a novel short wavelength pass light filter in which the long wavelength transmission limit can be selected by simply rotating a knob.

Another object of this invention is to provide a dispersion type adjustable light filter in which the treated and untreated parallel light ray bundles are colinear.

Yet another object of this invention is to provide a compact filter instrument which can be constructed to give an abrupt or sharp characteristic cutoff and to operate anywhere in a wide spectral range of visible, ultraviolet, or infrared radiation.

Other objects and attendant advantages of this invention will become more readily apparent and understood from the attached specification and accompanying drawings in which:

FIG. 1 is a full size perspective view of a novel optical filter incorporating features of this invention;

FIG. 2 is a section taken on line 2—2 of FIG. 1;

FIG. 3 is a schematic diagram showing the path of the light through the optics of the invention;

FIG. 7 is a section taken on line 7—7 of FIG. 5.

Figure 4:
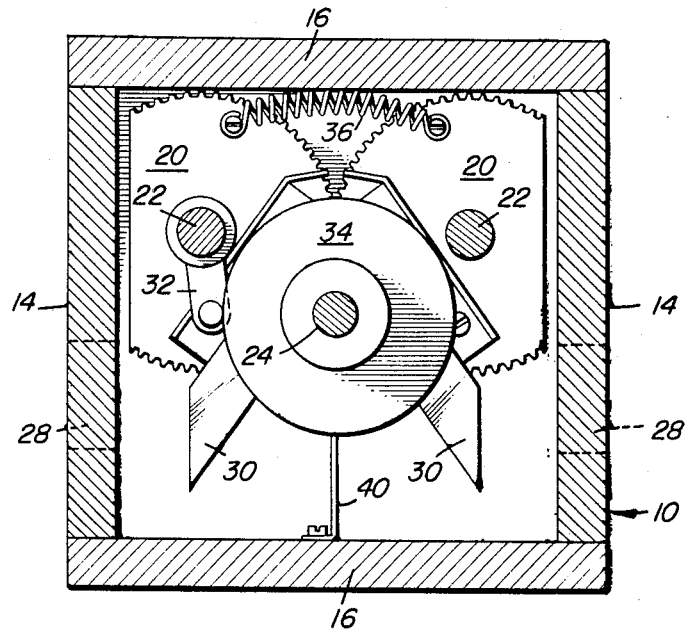
FIG. 4 is a section taken on line 4—4 of FIG. 2.

Referring now to the details of the drawings as shown in FIGS. 1 and 2, this filter instrument 10 consists of an enclosure box having a base 12 upon which window plates 14 and side plates 16 are mounted. A pair of parallel long shafts 22 are journaled at one end in the base 12 and at the other in a cover plate 18.

To each shaft 22, there is secured near the base end a gear sector 20, and these sectors 20 are in mesh so as to rotate oppositely as illustrated in FIG. 4. One shaft 22 has a cam follower arm 32 attached near its end at cover plate 18. A spring 36 connects one gear sector 20 to the other gear sector 20 so as to tend to rotate the latter shaft 22 and urge the cam follower arm 32 to contact an eccentric cam 34.

A stub or control shaft 24 mounting this cam 34 is journaled in and extends outside of the cover plate 18 where a knob and dial 38 are secured as illustrated in FIG. 1.

Figure 5:
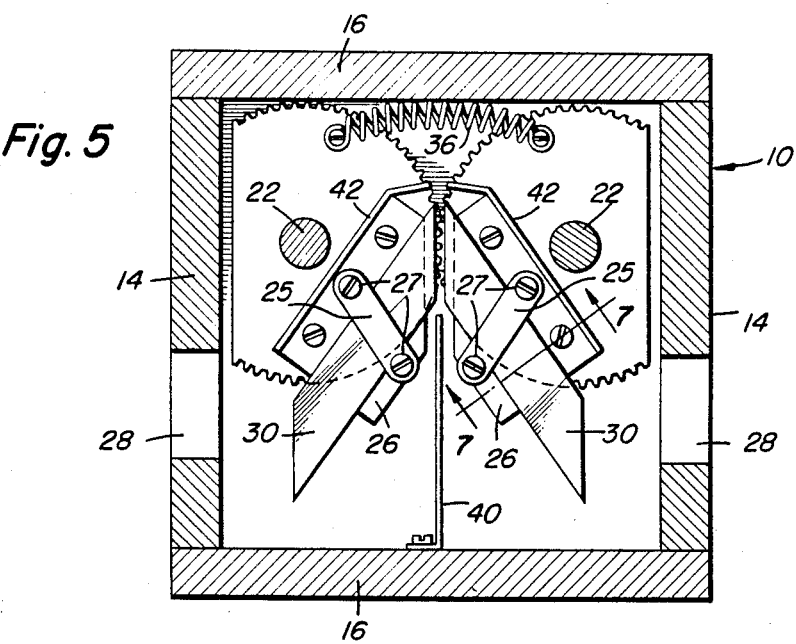
FIG. 5 is a section taken on line 5—5 of FIG. 2.
Figure 6:
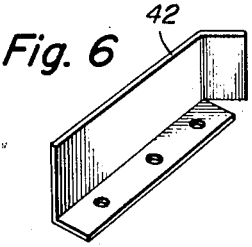
FIG. 6 is a detail perspective view showing a light baffle for the filter.

A holder plate 26 is fastened to the face of each gear sector 20 for the purpose of securing a pair of optical rhombs 30 each with a strap 25 and screws 27 as shown in FIGS. 5 and 7.

The rhombs 30 are made of a material such as glass, quartz, lithium fluoride, etc. chosen to have transmission and high dispersion for the wavelengths of interest and are ground and polished with flat faces so related as to satisfy a condition illustrated in FIG. 3. The incoming light ray bundle of radiation (arrow at the right in FIG. 3) is arranged to enter one rhomb 30 at close to incidence. Then, following the dotted line, at each reflection, the radiation strikes the air interface on one of the parallel sides with the critical angle as determined by Fresnel's law of reflection.

Thus, a long wavelength component of the light radiation is allowed to exit from a parallel side of the rhomb 30 while the remainder of shorter wavelength radiation undergoes further reflections of the same type to finally exit from the first rhomb 30 at the other end face with near normality.

The second rhomb 30 receives this light bundle of radiation at near normal incidence to its end face and the critical angle reflections similarly occur.

As illustrated in FIG. 3, a total of eight reflections give a good sharp cutoff operation. However, more or less reflections of the radiation can be designed for as desired by elongating or shortening the rhombs 30.

It will be noted the filtered light (second arrow) emerges at near normal to the end face of the second rhomb 30 and coaxial with the incoming bundle (first arrow). Suitable windows 28 are located in the window plates 14 of the instrument 10 adjacent to these locations as best shown in FIG. 5. A baffle plate 40 and shields 42 are provided between the rhombs 30 and on the upper sides thereof respectively to prevent scattered light and reflected light from existing with the treated rays.

When the rhombs 30 are rotated to some other angle, the angle of incidence within changes and the cutoff of the action of the filter shifts to a different wavelength. A typical range of adjustment, for example, is a shift of wavelength from 2500 to 2600 Angstrom units. This range can be marked with suitable calibration marks 44 on the dial 38.

What is claimed is:

1. In an optical filter system having a selective wavelength cutoff means for filtering a beam of radiant energy including means for passing the beam through an optical rhomb disposed at a critical angle of incidence to the axis of the beam, the improvement comprising: structure defining an enclosed box type housing having a pair of opposed windows respectively in one pair of faces thereof for passage of a said beam of radiant energy therethrough, means including a pair of parallel, rotatable shafts journaled between the top and bottom of said housing, gear means secured to each shaft and arranged to intermesh with each other and rotate in opposite directions with their respective shafts, a control shaft means arranged parallel to said pair of parallel, rotatable shafts and extending through the top of said housing and exteriorly thereof, eccentric cam means positioned on said control shaft means, a cam follower arm means on one of said pair of parallel, rotatable shafts arranged to contact said eccentric cam means, spring means connecting said gear means for said pair of parallel shafts together so as to tend to rotate said shafts and urge said cam follower arm means to contact said eccentric cam means and remain in engagement therewith, and an optical rhomb mounted to each said gear means with a light transmitting face of each rhomb being in substantially parallel opposed spaced relationship with a corresponding light transmitting face of the other said rhomb and their respective opposite light transmitting faces positioned adjacent to said windows in said housing respectively whereby ingress and egress of said beam of radiant energy is provided on the same said beam axis.

2. In an optical filter system as recited in claim 1, the improvement wherein said control shaft means includes a device for selectively positioning said rhombs with respect to each other in angle and said gear means includes a plate having guide means and retaining means including a strap for translatory adjustment of the said opposed spaced relationship of said rhomb faces.

3. In an optical filter system as recited in claim 1, the improvement wherein each said gear means comprises a gear sector.

4. An optical filter system as recited in claim 1, wherein said rhombs are formed of a material chosen to have transmission and high dispersion of radiant energy.

References Cited

UNITED STATES PATENTS

| | | | |
|---|---|---|---|
| 2,211,238 | 8/1940 | Links | 350—286 |
| 2,670,648 | 3/1954 | Miller et al. | 350—168 X |
| 2,798,411 | 7/1957 | Coleman | 350—182 X |

OTHER REFERENCES

Hammer & Lohmann, "Ein Monochromator auf der Basis der Total Reflexions Grenze," Optik, January 1958, vol. 15.

DAVID SCHONBERG, Primary Examiner

T. H. KOSMER, Assistant Examiner

U.S. Cl. X.R.

350—286, 287